United States Patent
Hu

(10) Patent No.: US 8,013,644 B2
(45) Date of Patent: Sep. 6, 2011

(54) POWER SUPPLY CIRCUIT FOR SOUTH BRIDGE CHIP

(75) Inventor: Ke-You Hu, Shenzhen (CN)

(73) Assignees: Hong Fu Jin Precision Industry (WuHan) Co., Ltd., Wuhan, Hubei Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/605,144

(22) Filed: Oct. 23, 2009

(65) Prior Publication Data

US 2011/0050298 A1    Mar. 3, 2011

(30) Foreign Application Priority Data

Sep. 2, 2009    (CN) .................. 2009 2 0309489 U

(51) Int. Cl.
*H03L 7/00*    (2006.01)
(52) U.S. Cl. ......... 327/141; 327/163; 375/373; 375/376
(58) Field of Classification Search .................. 327/141, 327/144–163; 331/15–17; 375/373–376
See application file for complete search history.

(56) References Cited

U.S. PATENT DOCUMENTS

| | | | | |
|---|---|---|---|---|
| 3,519,946 | A  * | 7/1970 | Camezind | 330/299 |
| 6,839,301 | B2 * | 1/2005 | Lin et al. | 365/233.12 |
| 7,573,968 | B2 * | 8/2009 | Natsume | 375/371 |
| 7,795,957 | B1 * | 9/2010 | Hu | 327/558 |
| 2003/0165208 | A1 * | 9/2003 | Carter et al. | 375/373 |
| 2005/0015635 | A1 * | 1/2005 | Juan | 713/323 |
| 2006/0115033 | A1 * | 6/2006 | Natsume | 375/354 |
| 2008/0118017 | A1 * | 5/2008 | Su | 375/376 |

* cited by examiner

*Primary Examiner* — Lincoln Donovan
*Assistant Examiner* — Brandon S Cole
(74) *Attorney, Agent, or Firm* — Altis Law Group, Inc.

(57) ABSTRACT

A power supply circuit for a south bridge chip includes a voltage sampling circuit, a control circuit, and an I/O controller. The voltage sampling circuit comprises an input terminal capable of receiving a first voltage, and an output terminal capable of outputting a control signal. The control circuit is capable of receiving the control signal from the voltage sampling circuit and outputting a power good signal when a high voltage level control signal is received. The I/O controller is capable of receiving the power good signal from the control circuit, adjusting time sequence for the power good signal to synchronize with the first voltage, and outputting the adjusted power good signal to provide power for the south bridge chip.

4 Claims, 2 Drawing Sheets

POWER SUPPLY CIRCUIT FOR SOUTH BRIDGE CHIP

BACKGROUND

1. Technical Field

The present disclosure relates to power supply circuits, and particularly to a power supply circuit for adjusting time sequence of a power good signal provided to a south bridge chip.

2. Description of Related Art

With the rapid development of personal computers, more functionalities are being added to the motherboard resulting in increase of power usage. Typically, the computer can automatically go into a sleep mode when not in use, and a wake up circuit is provided in power management to awake the computer. A sleep/wake button is usually provided on the keyboard of the computer that is connected to the inner wake up circuit of the motherboard of the computer. The button is pressed by a user for switching between the sleep and normal functioning modes.

When the computer is awakened from the sleep mode, components on a motherboard of the computer are powered up. During the power up sequence of the motherboard, there is a plurality of signals (e.g., power good signal, +5V_DUAL voltage signal, +5V_STBY voltage signal, +3.3V_DUAL voltage signal) in the computer that should meet a required signal time sequence. Typically, the south bridge chip is used for waking up the computer. A power supply circuit is used for providing power to the south bridge chip. The typical power supply circuit converts the +5V_DUAL voltage signal to the +3.3V_DUAL voltage signal by a voltage regulator on the motherboard to provide power for the south bridge. However, the typical power supply circuit has a low response speed, and the +5V_DUAL voltage signal is usually asynchronous with the power good signal during its rising up from low voltage level to high voltage level, which commonly causes the wake up circuit to fail.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
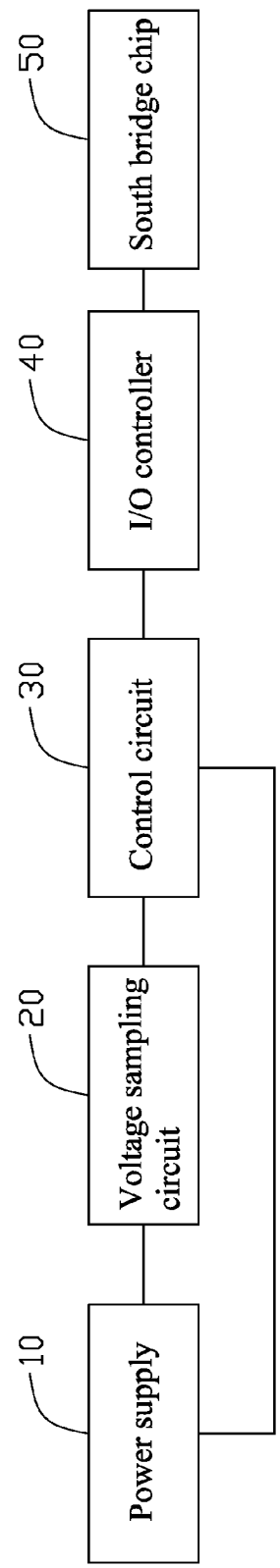
FIG. 1 is a block diagram of a power supply circuit for a south bridge chip, in accordance with an embodiment.

Referring to FIG. 1, a power supply circuit for a south bridge chip 50 includes a power supply 10, a voltage sampling circuit 20, a control circuit 30, and an I/O controller 40. The power supply 10 outputs a first voltage, a second voltage, and a third voltage. The voltage sampling circuit 20 includes an input terminal for receiving the first voltage, and an output terminal for outputting a control signal. The control circuit 30 is capable of receiving the control signal from the voltage sampling circuit 20, and outputting a power good signal when receives a high voltage level control signal. The I/O controller 40 is capable of adjusting time sequence for the power good signal to synchronize with the first voltage and outputting the adjusted power good signal to provide power for the south bridge chip 50.

Figure 2:
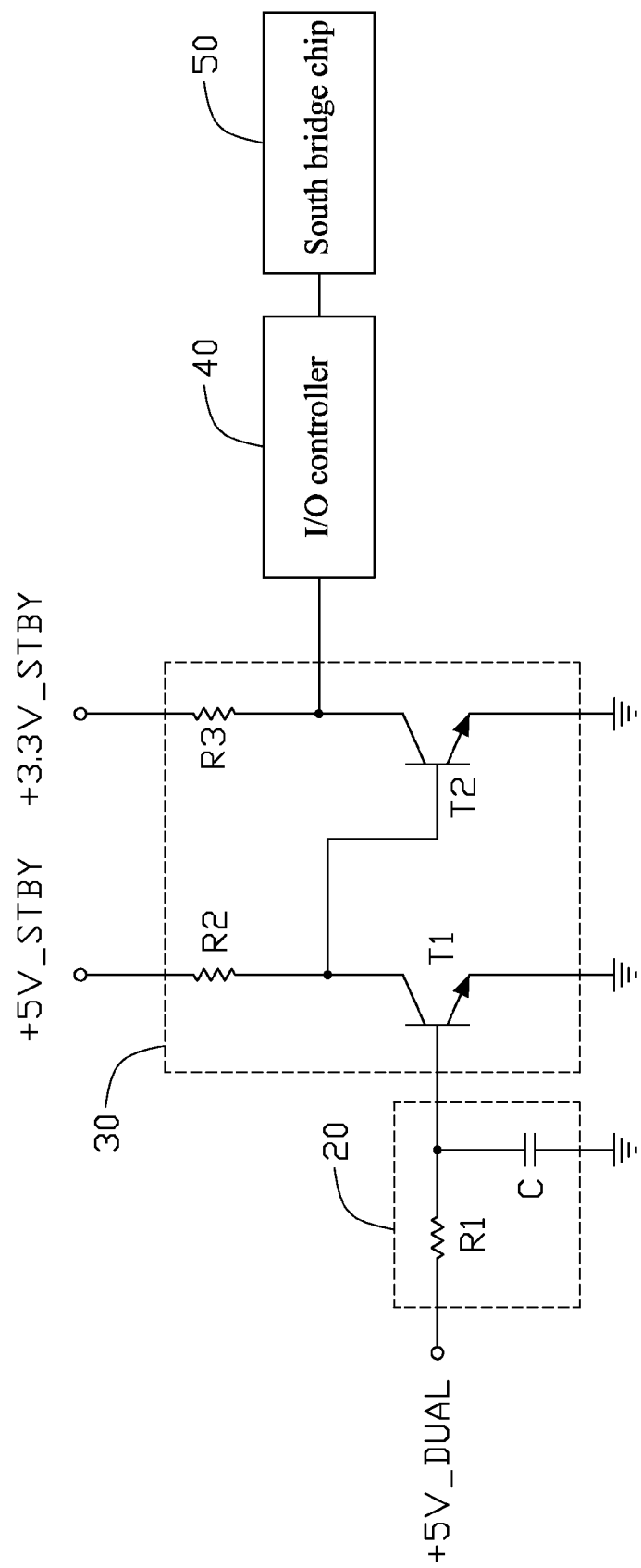
FIG. 2 is a circuit diagram of the power supply circuit for the south bridge chip of FIG. 1.

Referring to FIG. 2, the voltage sampling circuit 20 includes a first resistor R1 and a capacitor C. The first resistor first terminal is configured for receiving the first voltage via the voltage sampling circuit input terminal. The first resistor second terminal is electrically coupled to the capacitor first terminal. The capacitor second terminal is grounded. A connecting point between the first resistor R1 and the capacitor C outputs the control signal via the voltage sampling circuit output terminal.

The control circuit 30 includes a first input terminal, a second input terminal, a third input terminal, and an output terminal. The first input terminal is configured for receiving the control signal from the voltage sampling circuit 20. The second and third input terminals are configured for receiving the second and third voltages respectively. In one embodiment, the first, second and third voltages are +5V_DUAL voltage, +5V_STBY voltage, and +3.3V_STBY voltage respectively. The control circuit 30 output terminal is electrically coupled to the south bridge chip 50 via the I/O controller 40.

The control circuit 30 includes a second resistor R2, a third resistor R3, a first transistor T1, and a second transistor T2. The first transistor base is configured for receiving the control signal from the voltage sampling circuit 20 via the control circuit first input terminal. The first transistor collector is electrically coupled to the second resistor first terminal and the second transistor base. The second resistor second terminal is configured for receiving the second voltage via the control circuit second input terminal. The second transistor collector is electrically coupled to the third resistor first terminal, and is electrically coupled to the I/O controller 40 via the control circuit output terminal. The third resistor second terminal is configured for receiving the third voltage via the control circuit third input terminal. The first and second transistors emitters are grounded. In this embodiment, the first and second transistors T1, T2 are NPN type transistors.

In one embodiment, the power supply 10 outputs the first, second and third voltages. The voltage sampling circuit 20 converts the +5V_DUAL voltage to a high voltage level control signal. The control circuit 30 receives the high voltage level control signal. The first transistor T1 base is at a high voltage level and is turned on. The second transistor T2 base is at a low voltage level and is turned off. The second transistor T2 collector outputs a high voltage level power good signal to the I/O controller 40 via the control circuit 30 output terminal. The I/O controller 40 adjusts time sequence for the power good signal to synchronize with the +5V_DUAL voltage at the voltage sampling circuit 20 input terminal. The adjusted power good signal is output to provide power for the south bridge chip 50. The transistors T1, T2 have a high response speed, and the adjusted power good signal is synchronize with the first voltage. Thereby, circuit failure is avoided.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power supply circuit for south bridge chip, comprising:
   a voltage sampling circuit comprising an input terminal capable of receiving a first voltage, and an output terminal capable of outputting a control signal;
   a control circuit capable of receiving the control signal from the voltage sampling circuit and outputting a power good signal when a high voltage level control signal is received;
   an I/O controller capable of receiving the power good signal from the control circuit, adjusting time sequence for the power good signal to synchronize with the first voltage, and outputting the adjusted power good signal to provide power for the south bridge chip; wherein the voltage sampling circuit comprises a capacitor and a first resistor; a first resistor first terminal is configured for receiving the first voltage via the voltage sampling circuit input terminal; a first resistor second terminal is electrically coupled to a capacitor first terminal, a capacitor second terminal is grounded; a connecting point between the first resistor and the capacitor outputs the control signal via the voltage sampling circuit output terminal; and
   a power supply capable of outputting the first voltage to the voltage sampling circuit input terminal; wherein the power supply is capable of outputting a second and a third voltage to the control circuit; the control circuit comprises a first input terminal, a second input terminal, a third input terminal, and an output terminal; the first input terminal is configured for receiving the control signal from the voltage sampling circuit, and the second and third input terminals are configured for receiving the second and third voltages respectively, and the control circuit output terminal is electrically coupled to the south bridge chip via the I/O controller.

2. The power supply circuit for south bridge chip of claim 1, wherein the first, second and third voltages are +5V_DUAL voltage, +5V_STBY voltage, and +3.3V_STBY voltage respectively.

3. The power supply circuit for south bridge chip of claim 1, wherein the control circuit comprises a first transistor and a second transistor; the first transistor base is configured for receiving the control signal from the voltage sampling circuit via the control circuit first input terminal, and the first transistor collector is electrically coupled to a second resistor first terminal and the second transistor base; a second resistor second terminal is configured for receiving the second voltage via the control circuit second input terminal, and the second transistor collector is electrically coupled to a third resistor first terminal and is electrically coupled to the I/O controller via the control circuit output terminal; a third resistor second terminal is configured for receiving the third voltage via the control circuit third input terminal; and the first and second transistors emitters are grounded.

4. The power supply circuit for south bridge chip of claim 3, wherein the first and second transistors are NPN type transistors.

* * * * *